(12) United States Patent
Ahn et al.

(10) Patent No.: US 8,439,992 B2
(45) Date of Patent: May 14, 2013

(54) AUTO IGNITION TYPE AUTOTHERMAL REFORMER AND FUEL CELL SYSTEM HAVING THE SAME

(75) Inventors: Jin-Goo Ahn, Suwon-si (KR);
Sung-Chul Lee, Suwon-si (KR);
In-Hyuk Son, Suwon-si (KR);
Woo-Cheol Shin, Suwon-si (KR);
In-Seob Song, Suwon-si (KR); Ju-Yong Kim, Suwon-si (KR); Yong-Kul Lee, Suwon-si (KR); Tae-Keun Kim, Suwon-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 549 days.

(21) Appl. No.: 12/700,168

(22) Filed: Feb. 4, 2010

(65) Prior Publication Data

US 2010/0196776 A1    Aug. 5, 2010

(30) Foreign Application Priority Data

Feb. 5, 2009  (KR) .................. 10-2009-0009255

(51) Int. Cl.
*B01J 7/00*  (2006.01)
*C01B 3/36*  (2006.01)
*B01J 8/00*  (2006.01)

(52) U.S. Cl.
USPC ............... 48/61; 48/197 R; 502/527.24

(58) Field of Classification Search .............. 48/61
See application file for complete search history.

(56) References Cited

U.S. PATENT DOCUMENTS 6,258,330 B1   7/2001  Lesieur et al.
6,835,354 B2  12/2004  Woods et al.
2005/0271907 A1  12/2005  Kim et al.
2006/0207176 A1*  9/2006  Oroskar et al. ............ 48/61
2008/0010993 A1*  1/2008  Morgenstern ............ 60/780

FOREIGN PATENT DOCUMENTS

| JP | 2002-529895 A | 7/2001 |
| JP | 2004-193013 | 7/2004 |
| KR | 0542217 B1 | 12/2005 |
| KR | 2006-0065779 A | 6/2006 |
| KR | 10-2006-0098495 | 9/2006 |
| KR | 0818488 B1 | 10/2006 |

OTHER PUBLICATIONS

Korean Office Action (NOA) dated Oct. 26, 2010 in related Korean Patent Application No. 10-2009-009255.

* cited by examiner

*Primary Examiner* — Matthew Merkling
(74) *Attorney, Agent, or Firm* — Knobbe, Martens, Olson & Bear LLP

(57) ABSTRACT

An auto ignition type autothermal reformer (ATR) performs reproducible ignition using a catalyst that performs ignition without a separate ignition unit, such as an igniter or heating wire, and a fuel cell system having the ATR. The ATR includes a reaction container having a first opening through which a fuel is introduced into the reaction container and a second opening through which a reformate is discharged from the reaction container, the fuel having a mixture of an aqueous primary fuel solution and hydrogen peroxide; a first catalyst disposed adjacent to the first opening in the reaction container, the first catalyst being a granular catalyst; a second catalyst disposed at the rear portion of the first catalyst to promote an autothermal reforming reaction; and a third catalyst disposed at the rear portion of the second catalyst to promote an oxidation reaction.

29 Claims, 6 Drawing Sheets

AUTO IGNITION TYPE AUTOTHERMAL REFORMER AND FUEL CELL SYSTEM HAVING THE SAME

CROSS-REFERENCE TO RELATED APPLICATIONS

This application claims the benefit of Korean Patent Application No. 2009-9255, filed on Feb. 5, 2009, in the Korean Intellectual Property Office, the content of which is incorporated herein by reference.

BACKGROUND OF THE INVENTION

1. Field of the Invention

Aspects of the present invention relate to an auto ignition type autothermal reformer capable of performing reproducible ignition using a catalyst layer that performs ignition without a separate ignition unit, such as an igniter or heating wire, and a fuel cell system having the autothermal reformer.

2. Description of the Related Art

A fuel cell is an electric power generation system that directly converts chemical reaction energy between hydrogen and an oxidizer into electric energy. Here, the hydrogen may be contained in a hydrocarbon-based material, such as methanol or ethanol.

A polymer electrolyte membrane fuel cell (PEMFC) and a direct oxidation fuel cell are used as representative examples of fuel cells. When methanol is used as a fuel in the direct oxidation fuel cell, it is referred to as a direct methanol fuel cell (DMFC).

Generally, the PEMFC has a large energy density and a high output. However, subsidiary or auxiliary equipment, such as a fuel reformer, are required to produce hydrogen for a fuel gas. Here, the fuel reformer is used to reform methane or methanol, natural gas, and the like.

Fuel reformers are classified into steam reformers, partial oxidation (PDX) reformers, and autothermal reformers (ATR) according to the reforming processes used. The steam reformer has high hydrogen generation efficiency. However, heat is supplied to the steam reformer by an endothermic reaction, and the steam reformer has slow response characteristics. The PDX reformer uses an exothermic reaction, does not require heat supplied thereto, and has fast response characteristics. However, the hydrogen yield of the PDX reformer is not high. The ATR uses advantages of the aforementioned two reformers, uses less energy, and has fast response characteristics.

However, the ATR is heated at a temperature over the ignition point to perform initial starting or allows an ignition spark to be generated while controlling the ratio of fuel and oxygen. Such an ignition process requires a separate balance of plant (BOP), such as a heating wire, an igniter, or a starting control device. In the ignition process, a certain amount of power is consumed, which results in an increase of cost and degradation of fuel efficiency in view of the system. Further, the structure of a reformer is complicated, which results in decreases in productivity and durability.

If an igniter is used, the noise of the igniter may have negative effects on a system circuit. To solve such a problem, a component having high price and stability is currently used. Therefore, an igniter used in a conventional ATR increases manufacturing cost of the system. Further, the use of the igniter causes the instantaneous explosion of fuel in a reactor, which results decreases the durability of the catalyst and the reactor.

Meanwhile, in a heating process, it takes time to preheat a reformer upon initial starting, and power consumption required in preheating the reformer is large. Therefore, the capacity of a battery in a system to supply power thereto is increased. Further, a heater, such as a heating wire, is easily corroded due to over-heating, and over-heating may change the properties of the heater. Therefore, it is difficult to ensure durability of the fuel reformer.

SUMMARY OF THE INVENTION

Aspects of the present invention provide an autothermal reformer (ATR) capable of performing reproducible ignition of an aqueous fuel solution containing hydrogen peroxide, using a catalyst that performs ignition without a separate ignition unit, such as an igniter or heating wire, and a fuel cell system having the ATR.

Aspects of present invention provide a fuel cell system having the ATR, which is small and inexpensive and has a high performance and a high efficiency.

According to an aspect of the present invention, there is provided an ATR including a reaction container having a first opening through which a fuel is introduced into the reaction container and a second opening through which a reformate is discharged from the reaction container, the fuel having a mixture of an aqueous primary fuel solution and hydrogen peroxide; a first catalyst disposed adjacent to the first opening in the reaction container, the first catalyst being a granular catalyst; a second catalyst disposed at the rear portion of the first catalyst to promote an autothermal reforming reaction; and a third catalyst disposed at the rear portion of the second catalyst to promote an oxidation reaction.

According to aspects of the present invention, the first catalyst may have any one shape of a bead, a pellet, an egg shell, and combinations thereof. According to aspects of the present invention, the size of each of the granules of the granular catalyst may be in the range of 0.1 to 10 mm.

According to aspects of the present invention, the first catalyst may be an ATR catalyst to promote the autothermal reforming reaction. According to aspects of the present invention, the first catalyst may be an oxidation catalyst to promote the oxidation reaction.

According to aspects of the present invention, the volume of the first catalyst used may be ¼ to ½ of the volume of the second catalyst used.

According to aspects of the present invention, the first catalyst may include any one selected from the group consisting of platinum, palladium, and combinations thereof. The first catalyst may be an alumina support catalyst comprising platinum and palladium. The contents of the platinum and palladium may be 0.1 to 10 wt %. The first catalyst may include a promoter of a material selected from the group consisting of cerium (Ce), magnesium (Mg), manganese (Mn), iron (Fe), cobalt (Co), and combinations thereof. The content of the promoter in the first catalyst may be between about 0.001 to about 5.0 wt %.

According to aspects of the present invention, the second catalyst may be formed by coating a monolithic support with a catalyst material. The third catalyst may be formed by coating a monolithic support with a catalyst material. Alternatively, the third catalyst may be a granular catalyst. The volume of the third catalyst used may be ½ to 3/2 of the volume of the second catalyst used.

According to aspects of the present invention, the fuel may have a composition ratio selected in the range of ethanol:water:hydrogen peroxide from about 35:32.5:32.5 to about 25:37.5:37.5. The fuel may have a composition ratio of ethanol:water:hydrogen peroxide of about 30:35:35. The volume of the fuel supplied may be in the range of about 1/100 to about 1/10000 of the volume of the reformate produced.

According to aspects of the present invention, the fuel may be a liquid fuel supplied to the first catalyst. The primary fuel may include any one selected from the group consisting of methanol, ethanol, formic acid, isopropanol, and combinations thereof.

According to aspects of the present invention, the ATR may further include a fourth catalyst disposed at the rear portion of the third catalyst to reduce the concentration of carbon monoxide contained in the reformate produced in the second catalyst. The fourth catalyst may be a transfer catalyst to convert the carbon monoxide and water into hydrogen and carbon dioxide.

According to another aspect of the present invention, there is provided a fuel cell system including a fuel tank storing a fuel in which an aqueous primary fuel solution and hydrogen peroxide are mixed together; an ATR according to claim 1, which receives the fuel supplied from the fuel tank, starts through self-ignition, and produces a reformate by reforming the fuel; a carbon monoxide reducing unit disposed at the rear end portion of the ATR to reduce the concentration of carbon monoxide of the reformate; an electric generation unit to generate electricity by receiving hydrogen supplied from the carbon monoxide reducing unit and allowing the hydrogen to electrochemically react with oxygen; and a control unit to control the amount and composition of the fuel supplied to the ATR.

According to aspects of the present invention, the electric generation unit may include a unit cell in a polymer electrolyte membrane fuel cell (PEMFC) having an electrode containing platinum.

According to aspects of the present invention, the fuel cell system may further include a balance of plant (BOP) having a subsidiary power source, a pump to transfer a fluid, a sensor which controls heat or water in the fuel cell system, and wires and pipes to connect the components of the fuel cell system.

In an ATR according to aspects of the present invention, self-ignition is performed in a catalyst, so that a separate ignition unit, such as an igniter or heating wire, can be omitted. Accordingly, a small and low-priced device can be realized, and its durability can be improved because the ignition unit is not provided. Further, performance, such as reduction of starting time, can be improved. Furthermore, the amount of air additionally supplied for ignition can be omitted, so that the power consumption of a BOP can be saved in the start of a system, and the capacity and volume of a subsidiary power source, such as a secondary battery, can be reduced, thereby improving efficiency of the device having a small size.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
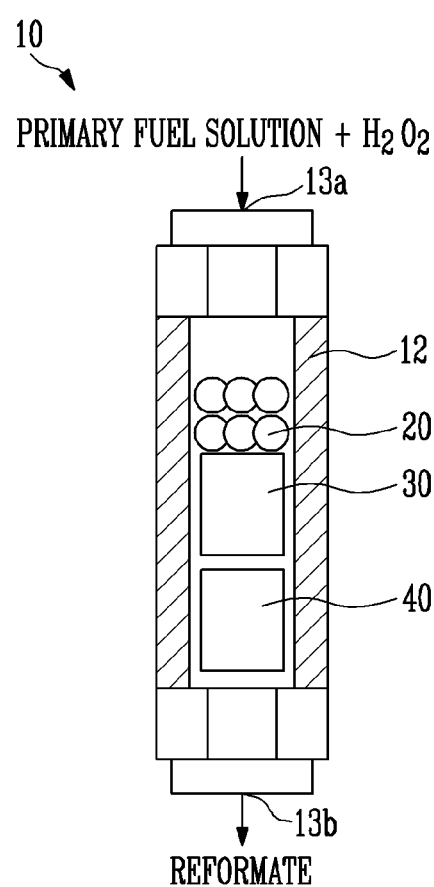
FIG. 1 is a schematic view of an autothermal reformer (ATR) according to an exemplary embodiment.

Reference will now be made in detail to the present embodiments of the present invention, examples of which are illustrated in the accompanying drawings, wherein like reference numerals refer to the like elements throughout. The embodiments are described below in order to explain the present invention by referring to the figures. In the following detailed description, only certain exemplary embodiments have been shown and described, simply by way of illustration. As those skilled in the art would realize, the described embodiments may be modified in various different ways, all without departing from the spirit or scope thereof. Accordingly, the drawings and descriptions are to be regarded as illustrative in nature and not restrictive. In addition, when an element is referred to as being "disposed adjacent to" another element, it can be disposed directly adjacent to the other element or be disposed indirectly adjacent to the other element with one or more intervening elements disposed therebetween. Also, when an element is referred to as being "connected to" another element, it can be directly connected to the other element or be indirectly connected to the other element with one or more intervening elements interposed therebetween.

FIG. 1 is a schematic view of an autothermal reformer (ATR) according to an exemplary embodiment of the present invention. Referring to FIG. 1, the ATR 10 includes a reaction container 12 that forms a reaction chamber, and first, second and third catalysts 20, 30 and 40, which are sequentially disposed in the reaction container 12. The reaction container 12 has a first opening 13a through which a fuel is introduced and a second opening 13b through which a reformate generated by catalysis of the fuel is discharged. Here, the fuel is a liquid fuel containing a primary fuel, water, and hydrogen peroxide. The primary fuel includes any one of ethanol, methanol, formic acid, isopropanol, and combinations thereof.

The ATR 10 has a catalyst configuration for self-ignition or auto-ignition. Specifically, the ATR 10 performs the self-ignition and autothermal reforming reaction through the catalyst configuration of the first, second, and third catalysts 20, 30, and 40. Here, the first catalyst 20 is disposed adjacent to the first opening 13a and formed of granular unit catalysts, i.e., the first catalyst 20 may be a granular catalyst. The second catalyst 30 is used for autothermal reforming reaction and disposed at the rear end portion of the first catalyst 20, i.e., between the first and third catalysts 20 and 40. The third catalyst 40 is used for an oxidation reaction and disposed at the rear end portion of the second catalyst 30, i.e., the third catalyst 40 is disposed adjacent to the second opening 13b.

When a fuel introduced into the ATR 10 through the first opening 13a passes through the first and second catalysts 20 and 30, oxygen and heat are generated as hydrogen peroxide is decomposed by a catalyst reaction. The generated heat heats the third catalyst 40, and the heated third catalyst 40 is automatically ignited at about 80° C. The ignited third catalyst 40 ignites the primary fuel to generate a large amount of heat, using oxygen supplied from the first and second catalysts 20 and 30. The heat of the third catalyst 40 allows an autothermal reforming reaction to be accelerated by heating the first and second catalysts 20 and 30. After a predetermined time elapses, the autothermal reforming reaction attains a normal or steady state.

The first catalyst 20 prevents a liquid fuel from directly contacting the third catalyst 40. That is, the first catalyst 20 allows the liquid fuel supplied to the second catalyst 30 to be appropriately distributed so that the third catalyst 40 can be self-ignited by the heat generated by the second catalyst 30. The first catalyst 20 may be a granular oxidation catalyst. For self-ignition, the first catalyst 20 and the second catalyst 30 decompose hydrogen peroxide, thereby generating heat.

In the ATR 10, the first catalyst 20, formed of granular unit catalysts, and the monolithic second catalyst 30 are disposed at the front end of the third catalyst 40 so that it is possible to prevent the liquid fuel from directly contacting the third catalyst 40, and a large amount of heat can be supplied to the third catalyst 40 by increasing resolution or decomposition of the hydrogen peroxide in the first and second catalysts 20 and 30. Accordingly, reproducible self-ignition is possible.

Further, it is unnecessary to supply separate air for ignition by way of the balance of plant (BOP) of the ATR 10 itself or a fuel cell system having the ATR 10. Accordingly, power consumption can be saved, and the volume of the BOP can be decreased. Furthermore, when using a fuel mixed with hydrogen peroxide, the freezing point of the fuel is depressed, and therefore, the fuel is not frozen even at an extremely low temperature, e.g., −20° C. Accordingly, the ATR 10 can be started at a low temperature.

Figure 2:
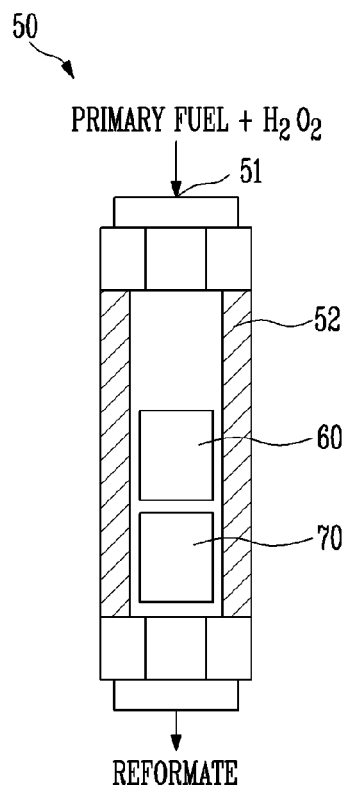
FIG. 2 is a schematic view of an ATR according to a first comparative example.

FIG. 2 is a schematic view of an ATR according to a first comparative example. Referring to FIG. 2, the ATR 50 according to the first comparative example includes a reaction container 52 having a first opening 51 through which a fuel is introduced; a monolithic ATR catalyst 60 disposed adjacent to the first opening 51; and a monolithic oxidation catalyst 70 disposed at the rear end portion of the ATR catalyst 60.

Although a liquid fuel in which an aqueous primary fuel solution and hydrogen peroxide are mixed is supplied to the ATR 50 according to the first comparative example, the ATR 50 is not self-ignited. This is because the liquid fuel directly contacts the monolithic oxidation catalyst 70 disposed at the rear end portion of the ATR catalyst 50, thereby preventing an oxidation reaction. In other words, the liquid fuel that directly contacts the oxidation catalyst 70 prevents the oxidation catalyst 70 from being heated by the heat of decomposition of the hydrogen peroxide generated from the ATR catalyst 60. Therefore, the temperature of the oxidation catalyst 70 does not properly increase to its ignition point. As described above, in the ATR 50 according to the first comparative example, the liquid fuel is not properly evaporated by heat from the decomposition of the hydrogen peroxide. For this reason, the ATR 50 does not self-ignite.

Figure 3:
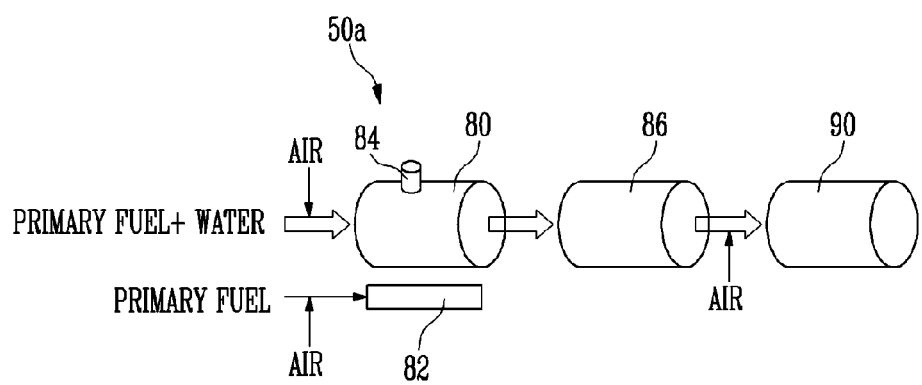
FIG. 3 is a block diagram of an ATR according to a second comparative example.

FIG. 3 is a schematic block diagram of an ATR according to a second comparative example. Referring to FIG. 3, the ATR 50a includes an autothermal reforming reactor 80 having a catalyst for autothermal reforming reaction; a transfer reactor 86 having a catalyst for a water gas shift (WGS) reaction; and a carbon monoxide reducing unit 90 having a catalyst for selective oxidation or preferential oxidation (PROX).

The autothermal reforming reactor 80 produces a reformate from a fuel via a reforming reaction in which steam reforming and PROX reforming are combined together. A primary fuel, water, and air are supplied together to the autothermal reforming reactor 80. The primary fuel includes a liquid fuel, such as methanol or ethanol, or a gas fuel, such as liquefied petroleum gas (LPG) or liquefied natural gas (LNG). The temperature of the autothermal reforming reactor 80 is controlled by a heat source 82. A fuel for ignition, supplied to the heat source 82, may be identical to or different from the primary fuel. The heat source 82 may include a burner. Under a predetermined temperature, the fuel supplied to the autothermal reforming reactor 80 is ignited by an ignition unit 84 of the autothermal reforming reactor 80. The ignition unit 84 may include an igniter.

The transfer reactor 86 may be connected to the rear end portion of the autothermal reforming reaction 80, and the carbon monoxide reducing unit 90 may be connected to the rear end portion of the transfer reactor 86. The transfer reactor 86 and/or the carbon monoxide reducing unit 90 may be disposed as separate devices or may be integrally disposed together with the autothermal reactor 80.

If an aqueous ethanol solution and air are introduced into a catalyst layer of the autothermal reforming reactor 80, i.e., a monolithic alumina catalyst with Rh and Ce, ethanol is oxidized to generate heat. In the ATR 50a, an ethanol oxidation reaction and an ethanol steam reforming reaction are simultaneously performed using the generated heat. That is, in the autothermal reforming reactor 80, heat is generated while the ethanol is oxidized, and the ethanol steam reforming reaction is performed by the generated heat, thereby generating hydrogen. In the aforementioned case, the ethanol and air (or oxygen) may be equally mixed and evaporated. If the ethanol and oxygen are unequally mixed, a side reaction may occur while the mixture of the ethanol and oxygen increases or the amount of hydrogen generated decreases.

However, in the ATR 10 according to an exemplary embodiment of the present invention described above with reference to FIG. 1, a primary fuel, e.g., ethanol, water, and hydrogen peroxide having a predetermined concentration mixed together, is injected into a catalyst layer without evaporation. For this reason, it is unnecessary to allow ethanol and air (or oxygen) to be equally mixed and evaporated. That is, in the ATR 10 according to an exemplary embodiment of the present invention, hydrogen peroxide is decomposed through a double catalyst layer having granular and monolithic catalysts, and thus the liquid ethanol can be effectively evaporated, thereby resulting in self-ignition.

Meanwhile, in the ATR 50a according to the second comparative example, an Rh—Ce/Alumina catalyst is used as an ethanol autothermal reforming catalyst. In this case, if the ratio of hydrogen peroxide:ethanol:water is adjusted to be 30:35:35 wt %, the ATR 50a may automatically perform initial starting. However, in such a starting process, a rhodium (Rh) catalyst is sintered at a temperature of about 700 to 900° C. Therefore, reproducible ignition is impossible.

However, in the ATR 10 according to an exemplary embodiment of the present invention described above with reference to FIG. 1, sintering of catalysts is prevented by utilizing platinum (Pt) and palladium (Pd) as oxidation catalysts. Here, the platinum (Pt) and palladium (Pd) are not sintered too much at a temperature of about 700 to 900° C. When the platinum (Pt) and palladium (Pd) are used as autothermal reforming catalysts, $CH_4$ may be increased due to a side reaction in an autothermal reforming reaction, and therefore, the yield of the ATR 10 may be lowered. However, the ATR 10 according to an exemplary embodiment of the present invention is configured so that ignition is not substantially performed in the catalyst for autothermal reforming reaction, thereby obtaining a desired yield and performing reproducible self-ignition in the catalyst layer without a separate ignition unit.

Figure 4:
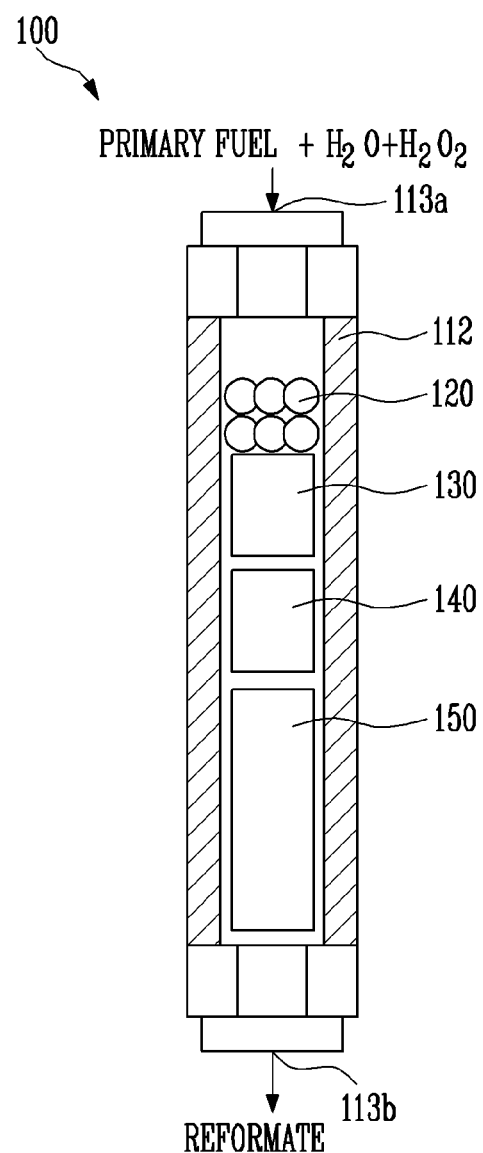
FIG. 4 is a schematic view of an ATR according to another exemplary embodiment.

FIG. 4 is a schematic view of an ATR according to an exemplary embodiment of the present invention. Referring to FIG. 4, the ATR 100 includes catalyst layers having a four-layer structure disposed in a reaction container 112.

The reaction container 112 has a first opening 113a through which a primary fuel, water, and hydrogen peroxide are introduced into the reaction container 112 and a second opening 113b through which a reformate generated by a thermal reforming reaction is discharged from the reaction container 112. The reaction container 112 may be formed of a stainless steel tube having a diameter of ¾ inch and a length of 30 cm. The reaction container 112 may be kept warm by a heat insulator (not shown) that surrounds the outer wall thereof.

A first catalyst 120, i.e, a first catalyst layer, is disposed adjacent to the first opening 113a and formed of granular unit catalysts, i.e., the first catalyst 120 may be a granular catalyst. The first catalyst 120 may be an ATR catalyst to promote an autothermal reforming reaction. The size (length or diameter) of each unit of the first catalyst 120 may be about 0.1 to 10 mm. For example, a granular Rh—Ce/Alumina catalyst may be used as the first catalyst 120. In the granular Rh—Ce/Alumina catalyst, 5 wt % of rhodium (Rh) and 5 wt % of cerium (Ce) are incorporated into alumina.

A second catalyst 130, i.e., a second catalyst layer, is disposed after the first catalyst 120 with respect to a flow direction of the ATR 100 or at the rear end portion of the first catalyst 120. The second catalyst 130 is an ATR catalyst to promote an oxidation reaction of hydrogen peroxide and a steam reforming reaction of the primary fuel. For example, a monolithic Rh—Ce/Alumina catalyst may be used as the second catalyst 130. In the monolithic Rh—Ce/Alumina catalyst, 5 wt % of rhodium (Rh) and 5 wt % of cerium (Ce) are incorporated into alumina. In the embodiment of the present invention, the cell density of the monolithic Rh—Ce/Alumina catalyst may be about 200 cells per square-inch (cpsi). The monolithic Rh—Ce/Alumina catalyst may be formed of a ceramic or metallic material.

A third catalyst 140, i.e., a third catalyst layer, is disposed after the second catalyst 130 with respect to the flow direction of the ATR 100 or at the rear end portion of the second catalyst 130. The third catalyst 140 is an oxidation catalyst to promote an oxidation reaction of the primary fuel. For example, a third catalyst 140 may include a monolithic Pt/Alumina catalyst in which 5 wt % of platinum is incorporated into alumina. The cell density of the monolithic Pt/Alumina catalyst may be about 200 cpsi.

A fourth catalyst 150, i.e., a fourth catalyst layer, is disposed after the third catalyst 140 with respect to the flow direction of the ATR 100 or at the rear end portion of the third catalyst 140 and adjacent to the second opening 113b of the ATR 100. The fourth catalyst 150 is a transfer catalyst to convert carbon monoxide contained in a reformate produced in the third catalyst 140 into hydrogen or carbon dioxide. When using the fourth catalyst 150, the concentration of the generated carbon monoxide can be lowered, whereas the yield of hydrogen gas can be increased. The fourth catalyst 150 may include any one selected from the group consisting of Pt, Cu, ZnO, $Al_2O_3$, and combinations thereof.

If a fuel in which an aqueous primary fuel solution and hydrogen peroxide are mixed is introduced as a reactant into the first opening 113a of the ATR 100 through a mass flow meter (MFC, Brooks 5850E), the hydrogen peroxide is decomposed while passing through the first and second catalysts 120 and 130. At this time, heat is generated from the decomposed hydrogen peroxide. When the third catalyst 140 is heated to 80° C. or higher by the decomposition heat of the hydrogen peroxide, an ethanol oxidation reaction is promoted by oxygen generated and transferred when the hydrogen peroxide is decomposed. Heat generated in the oxidation reaction of the third catalyst 140 is transferred to the first, second, and fourth catalysts 120, 130, and 150. Heat energy transferred from the third catalyst 140 to the second catalyst 130 accelerates an autothermal reforming reaction of the second catalyst 130, thereby creating a temperature suitable for the autothermal reforming reaction. A portion of the heat energy is transferred from the third catalyst 140 to the fourth catalyst 150.

According to the aforementioned configuration of the ATR 100, reproducible self-ignition can be induced at a composition ratio of the fuel, e.g., ethanol:water:hydrogen peroxide from about 35:32.5:32.5 to about 25:37.5:37.5 wt %, particularly, ethanol:water:hydrogen peroxide of about 30:35:35 wt %, which shows good performance for the autothermal reforming reaction but is not a range in which the fuel naturally ignites.

Figure 5:
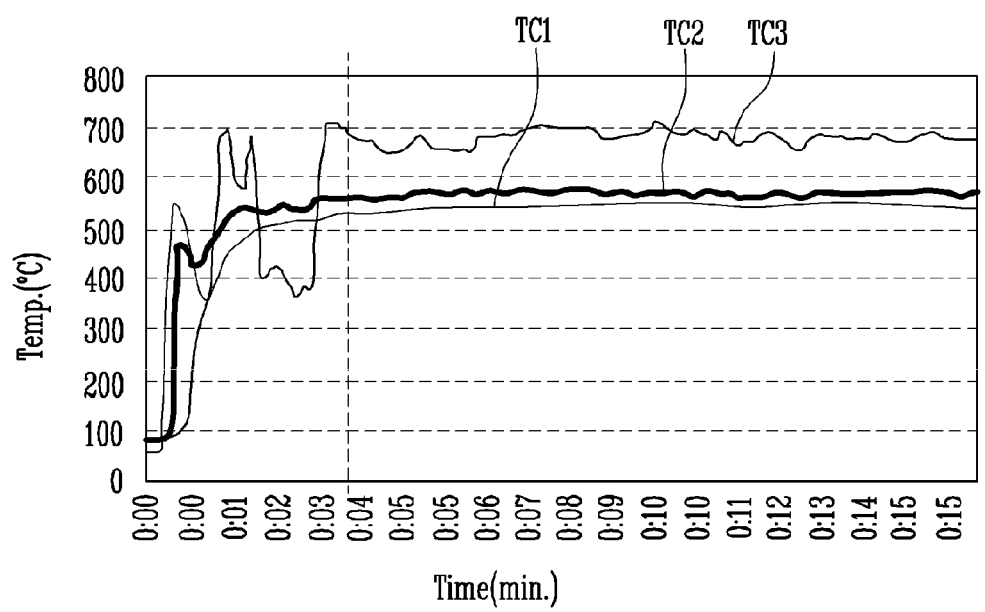
FIG. 5 is a graph showing changes in reaction temperature in the ATR of FIG. 4.

FIG. 5 is a graph showing changes in reaction temperature in the ATR of FIG. 4. The temperature with respect to time of the first catalyst 120 is shown as TC1; the temperature with respect to time of the second catalyst 130 is shown as TC2; and the temperature with respect to time of the third catalyst 140 is shown as TC3. As can be seen in the temperature profiles shown in FIG. 5, the temperatures of the respective catalyst layers is increased in the order of the third, second, and first catalysts 140, 130, and 120. After 4 minutes elapses, the reaction of each of the catalyst layers becomes a normal or steady state. Finally, a temperature gradient is shown in the temperature profiles. In the temperature profiles, the second catalyst temperature TC2 is higher than the first catalyst temperature TC1, and the third catalyst temperature TC3 is higher than the second catalyst temperature TC2.

The temperature of the reaction container 112 is decreased by evaporation of a fuel introduced into the reaction container 112. At this time, the fuel is accumulated in the third catalyst 140, and the temperature of the third catalyst 140 is decreased. Therefore, the third catalyst temperature TC3 is decreased during the initial 2 to 3 minutes. As time elapses, the temperature of the third catalyst 140 reaches the reaction temperature of the normal or steady state due to the thermal conduction through a wall of the reaction container 112. That is, the ATR 100 according to an exemplary embodiment of the present invention can start self-ignition at a normal temperature using a catalyst reaction.

The composition ratio of the fuel used in the autothermal reforming reaction according to an example embodiment of the present invention is shown in the following Table 1.

TABLE 1

| Fuel feed rate (sccm) | EtOH (wt %) | 50% $H_2O_2$/ EtOH (wt %) | TC1 (° C.) | TC2 (° C.) | TC3 (° C.) | Reformate (L) | CO (%) | $CO_2$ (%) | $CH_4$ (%) | $H_2$ (%) | THC (%) |
|---|---|---|---|---|---|---|---|---|---|---|---|
| 8 | 30 | 70 | 680 | 559 | 535 | 5.8 | 2.8 | 30.6 | 5.8 | 57 | 0.7 |

Meanwhile, in the catalyst configuration according to the example embodiment of FIG. 4, the activities of the first and second catalysts 120 and 130 are not high, resulting in the concentration of CH₄ being slightly high. As time elapses, the flux and composition of a reaction gas is changed according to a change in activity of the first catalyst 120. Therefore, a stable reaction may be slightly difficult to achieve. However, aspects of the present invention are not limited thereto, and a catalyst configuration capable of performing a stable reaction regardless of the change in activity of the first catalyst 120 will be described in detail.

Figure 6:
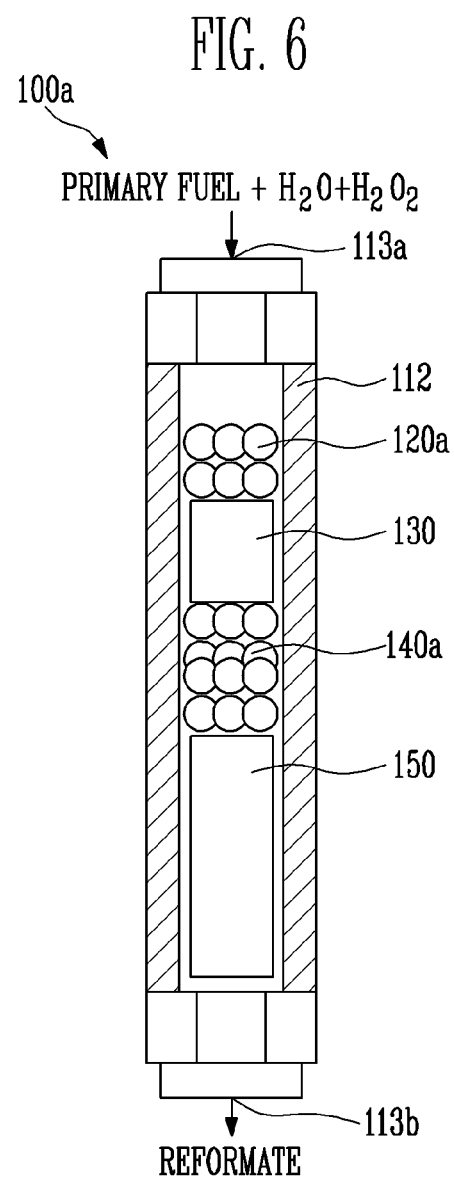
FIG. 6 is a schematic view of an ATR according to an exemplary embodiment.

FIG. 6 is a schematic view of an ATR according to an exemplary embodiment of the present invention. Referring to FIG. 6, the ATR100a includes a four catalyst layer structure disposed in a reaction container 112. The reaction container 112 has a first opening 113a through which a first fuel, water, and hydrogen peroxide are introduced into the reaction container 112, and a second opening 113b through which a reformate produced by an autothermal reforming reaction is discharged from the reaction container 112.

A first catalyst 120a is disposed adjacent to the first opening 113a, and a second catalyst 130 is disposed at the rear end portion of the first catalyst 120a. A third catalyst 140a is disposed at the rear end portion of the second catalyst 130, and a fourth catalyst 150 is disposed at the rear end portion of the third catalyst 140a adjacent to the second opening 113b.

Substantially, the configuration of the ATR100a according to the exemplary embodiment of FIG. 6 is similar to that of the ATR 100 described with reference to FIG. 4, except that the first catalyst 120a and the third catalyst 140a of the ATR100a are granular oxidation catalysts. The ATR100a according to an exemplary embodiment of the present invention has a catalyst configuration through which a catalyst reaction can more easily be stably performed as compared with the aforementioned ATR 100.

Specifically, reaction characteristics of the ATR100a of FIG. 6 were measured by fixing the amount of the third catalyst 140a at a certain amount and increasing the amount of the first catalyst 120a by 1 cc in the range of 1 to 5 cc. The results of the measured reaction characteristics are shown in the following Table 2.

As can be seen in Table 2, the most stable auto-ignition is induced when the amount of the first catalyst 120a is in the range of 2 to 3 cc. If the amount of the first catalyst 129a is 4 cc or more the ATR reaction of the second catalyst 130 is transferred to the first catalyst 129a disposed at the front end of the second catalyst 130. Therefore, the entire reaction yield is lowered. Accordingly, the amount (or volume) of the first catalyst 120a is maintained as about ¼ to about ½ of the amount of the second catalyst 130, which may be about 6 to 10 cc.

In addition, reaction characteristics of the ATR100a were measured by fixing the amount of the first catalyst 120a at 3 cc and increasing the amount of the third catalyst 140a by 2 cc in the range of 1 to 12 cc. The results of the measured reaction characteristics are shown in the following Table 3.

TABLE 3

| Amount of third catalyst (cc) | Starting time (min) | Fuel feed rate (sccm) | EtOH (wt %) | 50% H₂O₂/ EtOH (wt %) | TC1 (° C.) | TC2 (° C.) | TC3 (° C.) | Reformate (L) | CO (%) | CO₂ (%) | CH₄ (%) | H₂ (%) | THC (%) |
|---|---|---|---|---|---|---|---|---|---|---|---|---|---|
| 1 | 0 | 8 | 30 | 70 | | | | | | | | | |
| 3 | 10 | 8 | 30 | 70 | 680 | 720 | 500 | 6.5 | 1.5 | 28.0 | 1.8 | 57 | 0.2 |
| 5 | 6 | 8 | 30 | 70 | 700 | 740 | 510 | 7.3 | 2.0 | 26.5 | 1.0 | 60 | 0.1 |
| 7 | 4 | 8 | 30 | 70 | 710 | 780 | 520 | 7.9 | 1.9 | 25.0 | 0.4 | 64 | 0.1 |
| 9 | 6 | 8 | 30 | 70 | 710 | 790 | 524 | 8.0 | 2.0 | 24.5 | 0.1 | 67 | 0.0 |
| 12 | 14 | 8 | 30 | 70 | 730 | 750 | 550 | 7.5 | 4.0 | 29.0 | 0.3 | 51 | 0.0 |

As can be seen in Table 3, the most stable auto-ignition is induced when the amount of the third catalyst 140a is about 7 cc. If the amount of the third catalyst 140a is 5 cc or less, heat is not sufficiently provided to the first and second catalysts 120a and 130, and therefore, the temperature of the ATR100a is not increased appropriately. If the amount of the third catalyst 140a is 9 cc or more, it takes time to heat the third catalyst 140a due to too much of the third catalyst 140a, and therefore, starting time is delayed. Accordingly, the amount (or volume) of the third catalyst 140a is maintained as about ½ to about 3/2 of the amount of the second catalyst 130, which may be about 6 to 10 cc.

Meanwhile, in an exemplary embodiment of the present invention, the third catalyst 140a may be a granular catalyst but may be replaced by the monolithic third catalyst 140 shown in FIG. 4.

Figure 7:
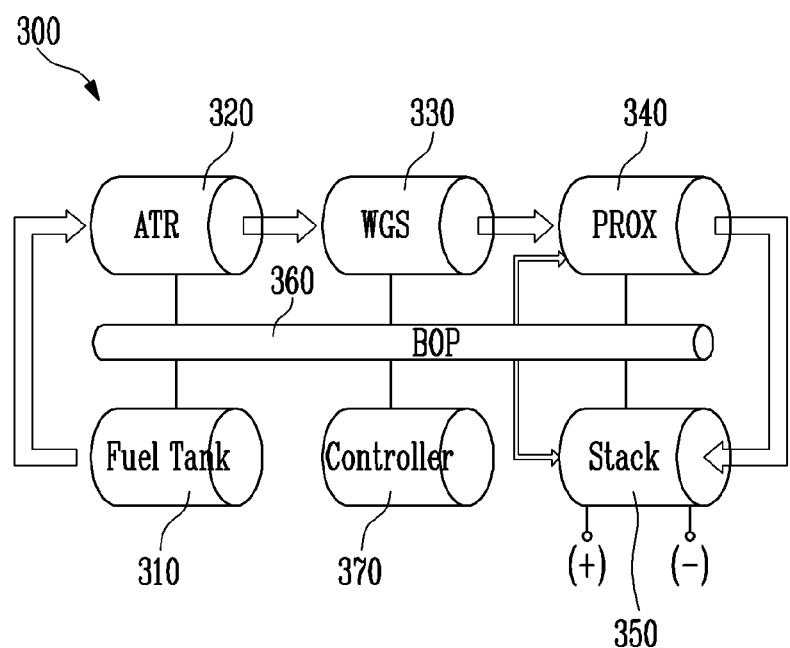
FIG. 7 is a block diagram of a fuel cell system having an ATR according to an exemplary embodiment.

FIG. 7 is a block diagram of a fuel cell system having an ATR according to an exemplary embodiment of the present invention. Referring to FIG. 7, the fuel cell system 300 includes a fuel tank 310, a first reactor 320, a second reactor 330, a third reactor 340, an electric generation unit 350, a balance of plant (BOP) 360, and a control unit 370.

The fuel tank 310 stores a liquid fuel in which a primary fuel (e.g., ethanol), water, and hydrogen peroxide are mixed together. Alternatively, the fuel tank may include a plurality

TABLE 2

| Amount of first catalyst (cc) | Starting time (min) | Fuel feed rate (sccm) | EtOH (wt %) | 50% H₂O₂/ EtOH (wt %) | TC1 (° C.) | TC2 (° C.) | TC3 (° C.) | Reformate (L) | CO (%) | CO₂ (%) | CH₄ (%) | H₂ (%) | THC (%) |
|---|---|---|---|---|---|---|---|---|---|---|---|---|---|
| 1 | 0 | 8 | 30 | 70 | | | | | | | | | |
| 2 | 4 | 8 | 30 | 70 | 700 | 750 | 540 | 7.5 | 2.0 | 26.5 | 0.7 | 63 | 0.2 |
| 3 | 4 | 8 | 30 | 70 | 740 | 800 | 570 | 7.7 | 2.6 | 24.8 | 0.5 | 65 | 0.1 |
| 4 | 4 | 8 | 30 | 70 | 800 | 700 | 535 | 5.8 | 3.0 | 30.6 | 3.8 | 57 | 0.2 |
| 5 | 3.8 | 8 | 30 | 70 | 840 | 680 | 520 | 5.5 | 3.5 | 32.1 | 5.8 | 51 | 0.2 | of sub-tanks in which a primary fuel, water, and hydrogen peroxide are respectively stored, valves, and a mixing unit for mixing such fluids.

The first reactor 320 has a catalyst configuration for autothermal reforming reaction and self-ignition. The first reactor 320 according to an exemplary embodiment of the present invention may be the ATR described with reference to FIG. 1, in that the first reactor 320 may include a granular first oxidation catalyst disposed at the front end of an ATR catalyst and a second oxidation catalyst disposed at the rear end portion of the ATR catalyst.

An alumina support catalyst containing platinum and palladium may be used as the first and second oxidation catalysts. Here, the contents of the platinum and palladium may be in the range of about 0.1 to about 10.0 wt %. For example, the contents of the platinum and palladium are in the range of about 0.5 to about 5.0 wt %. If the contents of the platinum and palladium are below 0.5 wt %, initial starting may be difficult. Particularly, if the contents of the platinum and palladium are 0.1 wt %, the initial starting is may be impossible. If the contents of the platinum and palladium are over 5.0 wt %, the oxidation catalysts may be sintered in an oxidation reaction. Particularly, if the contents of the platinum and palladium are over 10.0 wt %, the sintering of the oxidation catalysts may be serious.

The first and second oxidation catalysts may include a promoter of a material selected from the group consisting of cerium (Ce), magnesium (Mg), manganese (Mn), iron (Fe), cobalt (Co), and combinations thereof. In this case, the content of the promoter may be in the range of about 0.001 to about 5.0 wt %. For example, the content of the promoter is in the range of about 0.01 to about 1.0 wt %.

The first oxidation catalyst disposed at the front end of the ATR catalyst may have a granular shape, such as a pellet, a bead, an egg shell, and combinations thereof. The size of the first oxidation catalyst may be in the range of about 0.1 to about 10.0 mm. For example, the size of the first oxidation catalyst is in the range of about 1.0 to about 5.0 mm. If the size of the first oxidation catalyst is below 1.0 mm, pressure in the ATR is lowered. Particularly, if the size of the first oxidation catalyst is below 0.1 mm, the lowering of pressure is serious. If the size of the first oxidation catalyst is over 5.0 mm, bypass of the fuel occurs. Particularly, if the size of the first oxidation catalyst is over 10.0 mm, the bypass of the fuel is serious. If the arrangement of the first oxidation catalyst, the ATR catalyst, and the second oxidation catalyst is optimized considering the size of the first oxidation catalyst, the volume of the first oxidation catalyst is in the range of about ¼ to about ½ of the volume of the ATR catalyst, and the volume of the second oxidation catalyst is in the range of about ½ to about 3/2 of the volume of the ATR catalyst. At this time, the reaction container in which the first oxidation catalyst, the ATR catalyst, and the second oxidation catalyst are arranged sequentially may have an inner space with the same sectional area, such as a cylinder or a straight pipe.

The second reactor 330 has a transfer catalyst that converts carbon monoxide and steam in the reformate produced from the first reactor 320 into hydrogen and/or carbon dioxide. The combination of the first and second reactors 320 and 330 is similar to the ATRs described with reference to FIGS. 4 and 6.

The third reactor 340 has a catalyst (e.g., a PROX catalyst) which allows the concentration of carbon monoxide in the reformate produced from the second reactor 330 to be decreased to a desired concentration, e.g., 10 ppm or less.

The electric generation unit 350 generates electricity through electrochemical reaction of hydrogen in the reformate produced from the third reactor 340 introduced into an anode of the electric generation unit 350 and an oxidizer (e.g., oxygen in the air) introduced into a cathode of the electric generation unit 350. The electric generation unit 350 includes a fuel cell stack having a plurality of unit cells each having an electrode containing platinum. The fuel cell stack may be a polymer electrolyte membrane fuel cell (PEMFC) stack.

The BOP 360 includes a subsidiary power source, such as a secondary battery; a pump, which transfers a fluid; various types of sensors, which control heat or water in the fuel cell system 300; and wires and pipes to connect the components of the fuel cell system 300.

The control unit 370 controls the operation and environment of each of the components of the fuel cell system 300 under the control of the BOP 360. For example, the control unit 370 controls the composition ratio of the fuel introduced into the first reactor 320 to be in the range of ethanol:water:hydrogen peroxide from about 35:32.5:32.5 to about 25:37.5: 37.5 wt %. For example, the control unit 370 controls the composition ratio of ethanol:water:hydrogen peroxide of the fuel introduced into the first reactor 320 to be about 30:35:35 wt %. The ethanol fuel with the foregoing composition ratio does not naturally ignite but is subjected to self-ignition through the catalyst configuration of the first reactor 320 according to an exemplary embodiment of the present invention.

To obtain an optimum yield, the control unit 370 controls the amount of the fuel supplied to the first reactor 320 to be in the range of about 1/100 to about 1/10000 of the reformate produced in first reactor 320. For example, the control unit 370 may control the amount of the fuel to be about 1/1000 of the reformate produced in the first reactor 320.

The control unit 370 controls the amount of air supplied to the third reactor 340 so that the reformate produced through the catalyst reaction in the third reactor 340 has a concentration of carbon monoxide of 10 ppm or less. The control unit 370 controls the amount of air supplied to the cathode of the electric generation unit 350.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An autothermal reformer (ATR), comprising:
   a reaction container having a first opening through which a fuel is introduced into the reaction container and a second opening through which a reformate is discharged from the reaction container, the fuel having a mixture of an aqueous primary fuel solution and hydrogen peroxide;
   a first catalyst disposed adjacent to the first opening in the reaction container, the first catalyst being a granular catalyst;
   a second catalyst disposed at a rear portion of the first catalyst and configured to promote an autothermal reforming reaction, the second catalyst formed of a monolithic support coated with a catalyst material; and
   a third catalyst disposed at a rear portion of the second catalyst and configured to promote an oxidation reaction.

2. The ATR of claim 1, wherein the first catalyst has any shape of a bead, a pellet, an egg shell, and combinations thereof.

3. The ATR of claim 1, wherein the size of each of the granules of the granular catalyst is in the range of 0.1 to 10 mm.

4. The ATR of claim 1, wherein the first catalyst is an ATR catalyst to promote the autothermal reforming reaction.

5. The ATR of claim 1, wherein the first catalyst is an oxidation catalyst to promote the oxidation reaction.

6. The ATR of claim 5, wherein the volume of the first catalyst is ¼ to ½ of the volume of the second catalyst.

7. The ATR of claim 1, wherein the first catalyst includes anyone selected from the group consisting of platinum, palladium, and combinations thereof.

8. The ATR of claim 1, wherein the first catalyst is an alumina support catalyst comprising platinum and palladium.

9. The ATR of claim 8, wherein the first catalyst contains 0.1 to 10 wt % of each of the platinum and palladium.

10. The ATR of claim 9, wherein the first catalyst comprises a promoter selected from the group consisting of cerium (Ce), magnesium (Mg), manganese (Mn), iron (Fe), cobalt (Co), and combinations thereof.

11. The ATR of claim 10, wherein the content of the promoter in the first catalyst is between about 0.001 to about 5.0 wt %.

12. The ATR of claim 1, wherein the third catalyst is formed by coating a monolithic support with a catalyst material.

13. The ATR of claim 1, wherein the third catalyst is a granular catalyst.

14. The ATR of claim 1, wherein the volume of the third catalyst is ½ to ⅔ of the volume of the second catalyst.

15. The ATR of claim 1, wherein the fuel has a composition ratio selected in the range of ethanol:water:hydrogen peroxide from about 35:32.5:32.5 to about 25:37.5:37.5.

16. The ATR of claim 15, wherein the fuel has a composition ratio of ethanol:water:hydrogen peroxide is about 30:35:35.

17. The ATR of claim 1, wherein the volume of the fuel supplied is in the range of about 1/100 to about 1/10000 of the volume of the reformate produced.

18. The ATR of claim 1, wherein the fuel is a liquid fuel supplied to the first catalyst.

19. The ATR of claim 1, wherein the primary fuel includes anyone selected from the group consisting of methanol, ethanol, formic acid, isopropanol, and combinations thereof.

20. The ATR of claim 1, further comprising a fourth catalyst disposed at a rear portion of the third catalyst to reduce the concentration of carbon monoxide contained in the reformate produced in the second catalyst.

21. The ATR of claim 20, wherein the fourth catalyst is a transfer catalyst to convert the carbon monoxide and water into hydrogen and carbon dioxide.

22. An auto ignition autothermal reformer (ATR), comprising:
   a first granular oxidation catalyst;
   an autothermal reforming catalyst disposed after the first granular oxidation catalyst with respect to a flow direction of a fuel in the ATR, the autothermal reforming catalyst comprising a monolithic catalyst; and
   a second oxidation catalyst disposed after the autothermal reforming catalyst with respect to the flow direction of the fuel in the ATR.

23. The ATR of claim 22, wherein the second oxidation catalyst is a monolithic catalyst.

24. The ATR of claim 22, further comprising:
   a transfer catalyst disposed after the second oxidation catalyst with respect to the flow direction of the fuel in the ATR.

25. The ATR of claim 24, wherein the second oxidation catalyst is a granular catalyst.

26. The ATR of claim 22, wherein the fuel comprises:
   a primary fuel; water; and
   hydrogen peroxide.

27. The ATR of claim 26, wherein the primary fuel is one of methanol, ethanol, formic acid, isopropanol, and combinations thereof.

28. The ATR of claim 26, wherein the fuel has a primary fuel:water:hydrogen peroxide composition of about 35:32.5:32.5 to about 25:37.5:37.5.

29. The ATR of claim 22, wherein the ATR does not include an ignition unit.

\* \* \* \* \*